(12) United States Patent
Israelachvili

(10) Patent No.: US 6,578,410 B1
(45) Date of Patent: Jun. 17, 2003

(54) RESISTIVE CANTILEVER SPRING FOR PROBE MICROSCOPY

(76) Inventor: Jacob Israelachvili, 2233 Foothill La., Santa Barbara, CA (US) 93105

( * ) Notice: Subject to any disclaimer, the term of this patent is extended or adjusted under 35 U.S.C. 154(b) by 0 days.

(21) Appl. No.: 09/927,591

(22) Filed: Aug. 10, 2001

(51) Int. Cl.[7] ............................... G01B 5/28; G01B 7/34
(52) U.S. Cl. ....................................................... 73/105
(58) Field of Search ........................... 73/105; 250/306

(56) References Cited

U.S. PATENT DOCUMENTS 5,092,163 A * 3/1992 Young .......................... 73/105
5,760,300 A * 6/1998 Kajimura ...................... 73/105

* cited by examiner

*Primary Examiner*—Daniel S. Larkin
(74) *Attorney, Agent, or Firm*—The Kline Law Firm

(57) ABSTRACT

A dual- and triple-mode cantilever suitable for simultaneously measuring both normal (adhesion) and lateral (friction) forces independently in three orthogonal directions. The cantilever design allows the measurements to be performed at high sensitivity. The cantilever is useful in Scanning Probe Microscopes (SPM's) and other force-measuring devices, such as the Atomic Force Microscope (AFM), the Friction Force Microscope (FFM), and in probe attachments for the Surface Forces Apparatus (SFA) where both normal and lateral forces acting on a tip need to be accurately, and unambiguously measured. The cantilever structure may be used for both resistive and optical detection of tip deflections.

7 Claims, 4 Drawing Sheets

FIG. 2A - SLIP (PRIOR ART)
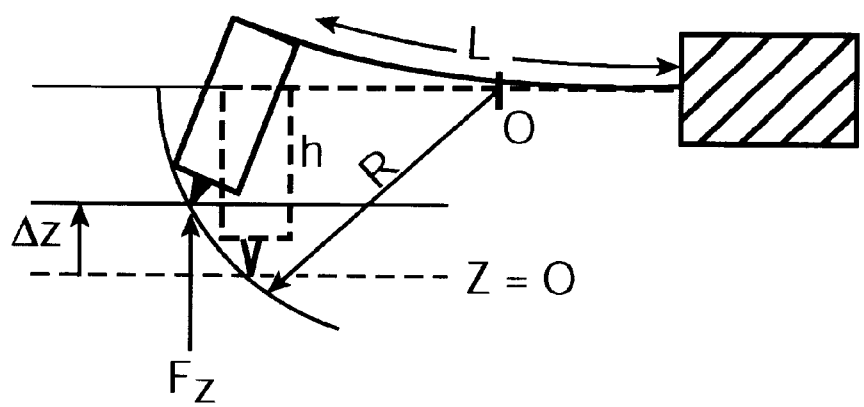
FIG. 2B - NO SLIP (PRIOR ART)
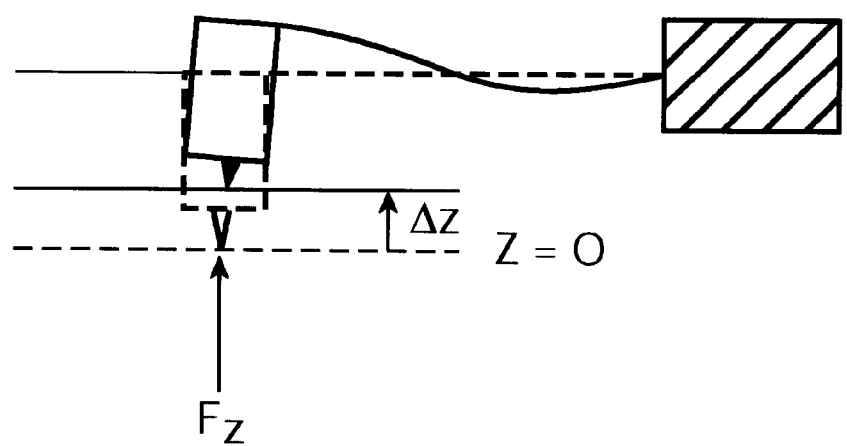

RESISTIVE CANTILEVER SPRING FOR PROBE MICROSCOPY

FIELD OF THE INVENTION

The present invention relates generally to surface forces measurement instrumentation, and more particularly is a cantilever spring assembly used in probe microscopy.

BACKGROUND OF THE INVENTION

Scanning Probe Microscopes (SPM's) are research instruments that have been in use in universities and industrial research laboratories since the early 1980's. These instruments allow for various imaging of surfaces as well as measurement of the intermolecular forces between two surfaces (or a small tip and a flat surface) in vapors or liquids. The distance resolution is 1 Å, which means that images and forces can be obtained at the atomic level. Over the years, the technique has been improved and its scope extended so that it is now capable of measuring many different surface properties and phenomena.

SPM's such as AFM's (Atomic Force Microscope) and STM's (Scanning Tunneling Microscope) generally consist of a sample surface and a fine round "tip" that is supported at the end of a force-measuring cantilever spring. They operate by first bringing (positioning) the tip near the surface and then moving the tip or surface vertically (contact or tapping mode) or laterally (scanning mode) while measuring the force produced on the tip by the surface. The force is calculated by measuring the deflection of the cantilever spring supporting the tip. These displacements are measured by one of three methods: (1) The most common method is the optical or beam deflection method (bouncing a laser light beam from the end of the cantilever spring and measuring its deflection from where it falls on a quadrant photo detector). (2) A less common method is the resistive method (using resistance, semi-conductor or piezo-resistive strain gauges in a half-bridge configuration. This method is illustrated in U.S. Pat. No. 5,444,244, by Michael D. Kirk et al., issued Aug. 22, 1995). (3) The least common method is the capacitance method (using a standard capacitance bridge). Both normal and lateral (friction) forces acting on the tip can in principle be measured by any of these methods. In cases where friction forces are measured, the AFM is often referred to as a Friction Force Microscope (FFM).

When making "force measurements" at different locations of a surface (i.e., on scanning) with an AFM or FFM tip, one is also recording topographical images of the surface, i.e., using the tip as a microscope (hence the origin of the name Atomic Force Microscope and Friction Force Microscope).

LIMITATIONS OF THE PRIOR ART

The limitations of the prior art may be best understood by first considering the equations that describe the response of a simple cantilever spring to different kinds of forces, both normal and lateral, that give rise to different kinds of spring deflections (such as bending, twisting, and buckling). Considering the equations that pertain to optical and resistive detectors, it can be seen that these two detection systems have inherently different sensitivities to the spring deformation. This analysis also explains why similarly shaped cantilever springs may exhibit high sensitivity to lateral forces when measured with the optical technique, but low sensitivity when measured with a resistive bridge. The criteria needed for a cantilever spring or spring system to have high resolution for both normal and lateral forces can then be established. The present invention illustrates these principles with a new cantilever design that constitutes the preferred embodiment of the invention.

FIG. 1A shows a "simple cantilever" spring of length L, width b, and thickness t. The spring is clamped at one end, with a rigid tip of length h at the free end. This is the basic design of a typical AFM or FFM cantilever, although other versions, for example, triangular or double (side-by-side) cantilevers (FIG. 1B and FIG. 1C), are more commonly used. These design modifications, however, do not change the basic analysis presented here regarding the optimization of cantilever design to measure normal and lateral forces independently and at high sensitivity, which is the object of this invention.

When a normal force $F_z$ or a lateral force $F_x$ or $F_y$ acts normally or horizontally on the tip at point P in FIG. 1A, the angular deflections $\Delta\theta$ at Q may be determined according to the following equations (where $\theta_{ij}$ refers to deflections of the cantilever about the j-axis due to a force applied along the i-direction, and where E is the Elastic Modulus of the cantilever material):

$\Delta\theta_{zx}=L^2F_z/2Ebh^3$ in bending mode due to a vertical force $F_z$ (1)

$\Delta\theta_{xy}=LhF_x/Ebh^3$ in twisting mode due to a lateral force $F_x$ (2)

$\Delta\theta_{yx}=3LhF_y/Ebh^3$ in buckling mode due to a lateral force $F_y$ (3)

Since in OPTICAL mode the light beam bounces off the surface at Q, the above angles give the angle by which the light is deflected (the total change of angle on reflection is actually $2\Delta\theta$), which in turn is proportional to the sensitivity by which the forces can be measured using a quadrant photodetector. Since in many applications we have $F_x \approx F_y \approx F_z$ (i.e., for friction coefficients close to 1), we see that high sensitivity to lateral forces (in twisting and buckling modes) compared to normal forces (in bending mode) can be achieved only for high values of h/L (h/L≈1).

In the case of cantilevers in RESISTIVE mode, the angular deflections at the tip P or surface Q given by Eqs. 1–3 are not what is measured by the resistive elements on the cantilever. (If resistive elements were to be placed at Q, they would hardly measure anything when the spring bends because the surface at Q is essentially rigid to local bending and remains flat when the other parts of the cantilever bend). Instead, the resistive elements must be placed along the compliant length of the cantilever, as in the Kirk et al. reference, U.S. Pat. No. 5,444,244. The cantilever bends into arcs of circles whose relevant angles of curvature are given by the following equations (cf. FIG. 1A):

$\Delta\theta_{zx} L^2F_z/2Ebh^3$ in bending mode due to a vertical force $F_z$ (4)

$\Delta\theta_{xx} 2hF_xEh^3$ in twist-bending mode due to a lateral force $F_x$ (5)

$\Delta\theta_{yx} 3LhF_y/Ebh^3$ in buckling mode due to a lateral force $F_y$ (6)

These angles are proportional to the sensitivity by which the forces can be measured using a resistance detector such as a Wheatstone bridge, and it should be noted that whereas Equations (4) and (6) are proportional to Equations (1) and (3), the expression for the twist-bending deflection, Equation (5), is different from Equation (2), the equation for pure twist. Thus, when measured with a resistive cantilever, high sensitivity to lateral forces in twist-bending mode compared to normal forces (in bending mode) can be achieved only for high values of $2hb/L^2$. This compares with the factor of h/L for the optical detection method.

Thus, if the tip length h is much smaller than L, which is the norm in all current cantilevers used in AFM's and FFM's, the sensitivity to measuring friction forces in the twist mode using the OPTICAL method will be less than the sensitivity to measuring normal forces (by a factor that is proportional to h/L). But using the RESISTIVE method, the loss in sensitivity is usually even worse, being now proportional to $2hb/L^2$ (unless b>L/2). The inventor believes that this is the reason for the very low sensitivity of current resistive cantilevers when measuring lateral forces, so much so that resistive cantilevers are not in common use for such purposes.

It may appear that this problem may be solved by increasing the length of the tip h and cantilever width b, i.e., making h≈b≈L. However, increasing h introduces a new problem. As shown in FIG. 2A, a longer tip at the end of a cantilever spring will move significantly out of the vertical when a normal (vertical) force $F_z$ or displacement $\Delta_z$ is applied to the tip. If the tip can slip (slide) freely along the surface, it will move along the arc of a circle of radius $R=(h^2+L^2/4)^{1/2}$ centered about the point O, which takes it further away from the vertical line for larger values of h. Only for small values of h (when h/L<<1) will this effect be unimportant, i.e., will the tip move perfectly vertically in the z-direction and so remain at the same x-y coordinates on the surface, at least for small deflections. However, for h≈L, the lateral displacement and tip bending that inevitably accompany the vertical displacement makes this solution impractical for unambiguous normal force measurements, at least when using the simple cantilever design shown in FIGS. 1A, 1B, and 1C.

In addition, depending on how 'stuck' the tip is to the surface, i.e., depending on the friction force between them, the tip deflection may be as shown in FIG. 2A or FIG. 2B or somewhere in between these two limits. Furthermore, the deflections may be different for upward and downward deflections (positive or negative z displacements) and therefore not even symmetrical about z=0.

A further limitation of the simple cantilever constructions illustrated in FIGS. 1A–C is that it is not obvious that purely vertical or lateral forces provide pure and independent bending along the different cantilever axes even when the tip length h is small. This is because of the complicated triangular or rectangular geometries of these commonly-used cantilevers.

Thus, with any geometry based in the simple cantilever construction shown in FIGS. 1A–C and FIGS. 2A–B, high resolution normal and lateral force measurements will always be coupled, and it will be impossible to measure one independently without also measuring some contribution from the other. This also implies that surface images will be likewise distorted and difficult to interpret.

It is therefore an objective of the present invention to provide a new cantilever design, based on the above equations, that will allow for independent measurements of tip-surface forces in both normal and lateral directions with similar high sensitivity for both measuring modes. The introduction of such a cantilever design would significantly enhance the ease of use and accessibility of AFM's and FFM's, and SFA's having an XYZ scanner (such as the one described in the inventor's U.S. Pat. No. 6,194,813, Issued Feb. 27, 2001) to carry out delicate friction force measurements.

SUMMARY OF THE INVENTION

In summary, the present invention is a dual- and triple-mode cantilever suitable for simultaneously measuring both normal (adhesion) and lateral (friction) forces independently in three orthogonal directions. The cantilever design allows the measurements to be performed at high sensitivity. The cantilever is useful in Scanning Probe Microscopes (SPM's) and other force-measuring devices, such as the Atomic Force Microscope (AFM), the Friction Force Microscope (FFM) and in probe attachments for the Surface Forces Apparatus (SFA) where both normal and lateral forces acting on a tip need to be accurately and unambiguously measured. The resistive cantilever structure may also be used for optical detection of tip deflections.

An advantage of the present invention is that it allows three orthogonal forces to be measured independently at the same time. Prior art devices only allow the simultaneous measurement of two orthogonal forces.

Another advantage of the present invention is that it provides a system that has a higher general sensitivity to measuring forces than the prior art devices by making use of a full-bridge configuration, rather than a half-bridge construction. This doubles the intrinsic electric sensitivity of the bridge. The present invention also effectively eliminates differential thermal drifts because all four resistance elements are located in close proximity. With the half-bridge configuration, two of the resistors are located far from the cantilever resistors, which makes it more difficult to balance the bridge.

A still further advantage of the present invention is that it enables a symmetrical design of the cantilever system that ensures that all force-detecting modes (bending, twisting, buckling, and twist-bending) will respond independently to tip forces acting along the x, y, and z directions.

Still another advantage of the present invention is that the new cantilever may also be used with the optical method of detecting displacement, wherein a light beam reflects off the cantilever surface at some suitable point (not necessarily the center).

BRIEF DESCRIPTION OF THE DRAWINGS

FIGS. 2A–B illustrates the bending deflections of a cantilever with a long rigid tip at one end due to a vertical force $F_z$ or displacement $\Delta z$ acting at P.

DETAILED DESCRIPTION OF THE INVENTION

Figures 1A, 1B, 1C:
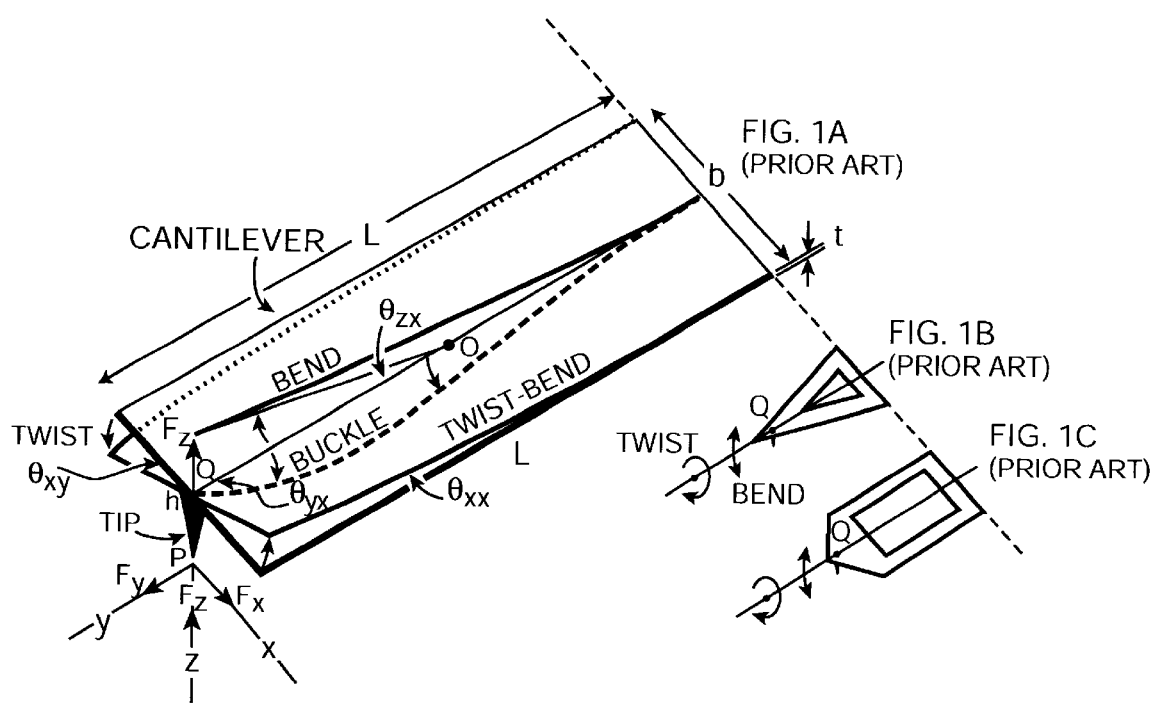
FIGS. 1A–C show three basic "simple cantilever" constructions known in the prior art.

FIG. 1A shows the four different types of deflection modes (bend, twist, buckle, and twist-bend) that can occur when normal or lateral forces ($F_z$, $F_x$ and $F_y$) are applied to a tip supported at the free end of a "simple cantilever" that is rigidly clamped at the other end. The corresponding deflection angles along different directions are given by Equations 1 to 6. Other simple cantilever constructions are also commonly employed in the prior art as in the Kirk, et al. reference, U.S. Pat. No. 5,444,244. Two of these devices are shown in FIGS. 1B and 1C, for which the same equations of motion apply (with minor modifications).

More complicated "complex lever" constructions involving multiple levers in series, multiple levers in parallel, and sectored levers are sometimes used in various applications whose deflections can be calculated by using one or more of the basic equations (Eqs. 1–6) that apply to a "simple cantilever", either in combination or suitably modified or rescaled. Examples of these constructions can be seen in the inventor's U.S. Pat. No. 5,861,954, issued Jan. 19, 1999, and incorporated herein by reference in its entirety, and in the disclosure by Gustavo Luengo, Franz-Josef Schmitt, Robert Hill, and Jacob Israelachvili, in Macromolecules 30 (1997) 2482–2494.

FIGS. 2A–B show why a "simple cantilever" cannot provide high resolution for both normal and lateral forces at the same time as these forces are measured independently. The main problem is that by extending the tip length (or, more correctly, the length of the rigid pillar or base supporting the tip) the tip bends and no longer moves in the z-direction when a force $F_z$ is applied along this direction.

Figure 3:
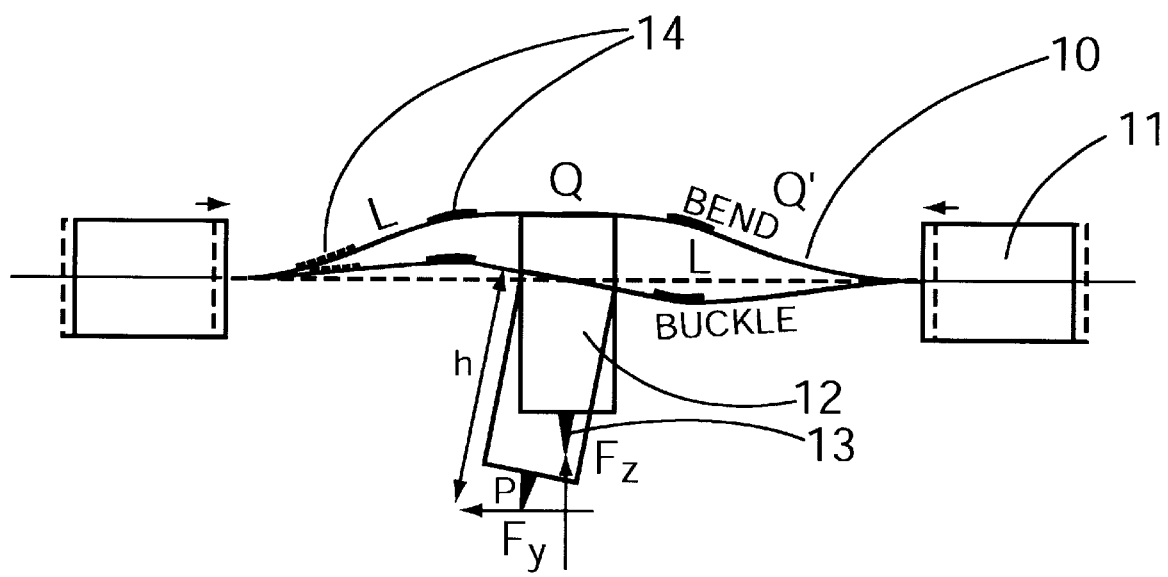
FIG. 3 is a schematic view of a preferred "symmetrical" design of the present invention.

Referring now to FIG. 3, a preferred embodiment design of the present invention includes two simple cantilevers 10 in series. The cantilevers 10 are fixed symmetrically about the tip 13 by clamping means 11 situated at both ends of the cantilevers 10. The cantilevers 10 may be either solid or split cantilevers as desired by the user.

The rigid base 12 of the tip 13 is located at the center of the cantilevers 10. In this symmetrical design, when a vertical force acts on the tip 13, it displaces the tip 13 purely in the z-direction without bending the tip 13 or shifting it laterally in any other direction. For lateral forces, pure buckling occurs for a force in the y-direction, and pure twist-bending for a force in the x-direction (out of the plane of the paper). Furthermore, because of the symmetrical construction, the same deflections will be measured when moving along the +y and –y directions, and along the +x and –x directions. (With the simple cantilever spring design of FIGS. 2A–B, deflections of the spring may be different along the +y and –y buckling directions).

The relevant equations for determining the various spring deflections for the construction shown in FIG. 3 are still as shown in Eqs. 1–6 above, but are appropriately scaled by factors of two to account for the series and double clamping configuration. Thus, equations 1–3 apply to OPTICAL measurements of displacements by reflecting a laser light beam from the top surface of the cantilever at Q or Q', i.e., not necessarily at the center Q. Equations 3–6 apply to RESISTIVE measurements, as when resistance elements 14 are placed at strategic points on the upper or lower faces of the cantilever surface as shown in FIG. 3.

It can be seen that for values of h (and b) close to L, the sensitivity of the system to normal forces $F_z$ is similar to the sensitivity to lateral forces $F_x$ and $F_y$. In addition, the sensitivity of the system of the present invention remains equivalent to that which is attainable with currently used resistive or optical cantilevers in normal mode operation.

Figure 4:
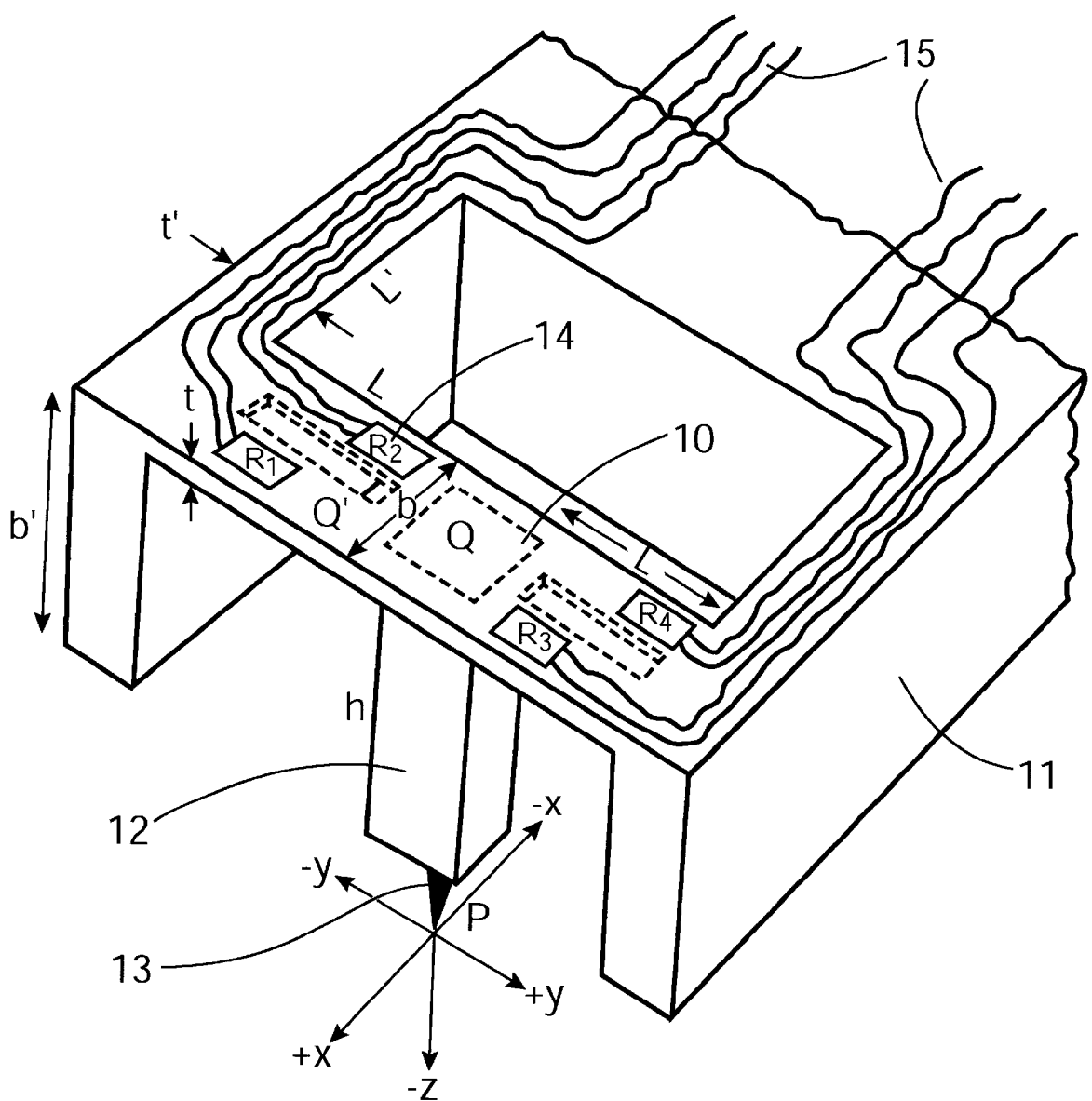
FIG. 4 is a perspective view of the preferred embodiment of the present invention.

FIG. 4 shows the preferred embodiment of the invention that makes use of the above equations and principles to optimize the performance of the system for high resolution in both normal and lateral force-measuring modes. The arms of the clamping means 11 act to provide rigid clamps holding the two series-connected cantilevers 10. The arms of the clamping means 11 do move slightly inwards, towards each other, when the cantilever spring 10 bends, buckles, or twists. The tip 13 and its rigid base 12 are shown on the underside of the cantilever 10, but may also be positioned to protrude upward from the top surface. The entire unit may be micro-fabricated from a single starting block.

The magnitudes of L, h, and b may be optimized to obtain the highest sensitivity in bending, buckling, and/or twist-bending modes, depending on the specific application. The cantilever width b can be split into two or more parts (as illustrated in the broken area in FIG. 4) to enhance sensitivity to twist and to avoid electrical interference between the gauges and connecting wires. The resistance strain gauges 14 may be placed as shown, but also at other positions on the cantilever 10, including both the top and bottom sides of the cantilever 10. By having the strain gauges 14 spaced well apart on the two sides of the cantilevers 10 as shown, unwanted electrical interference and noise is further minimized.

The four resistive elements 14 and their connective wires 15 allow for a full-bridge operation which is more sensitive and less susceptible to thermal drift than a half-bridge or single-gauge construction as is known in the art. However, the present invention presents three possible full-bridge configurations, instead of the two configurations possible with prior art devices. Thus, if the initial values of all four resistances are the same and equal to R, and if orthogonal forces $F_z$, $F_x$, and $F_y$ along the +z, +x, and +y directions indicated in FIG. 4 are then applied at P, the changes in the resistances may be written as:

$$R_1 \rightarrow (R - \Delta R_z + \Delta R_x + \Delta R_y) \tag{7}$$

$$R_2 \rightarrow (R + \Delta R_z - \Delta R_x + \Delta R_y) \tag{8}$$

$$R_3 \rightarrow (R + \Delta R_z + \Delta R_x - \Delta R_y) \tag{9}$$

$$R_4 \rightarrow (R - \Delta R_z - \Delta R_x - \Delta R_y) \tag{10}$$

where $\Delta R_z$ $F_z$ is due to pure bending, $\Delta R_x$ $F_x$ is due to pure twist-bending, and $\Delta R_y$ $F_y$ is due to pure buckling. The bridge can be configured to measure the four resistances in three combinations which involve adding the currents from two resistors and subtracting the currents from the two remaining resistors. There are three ways of doing this. The output currents from these three combinations are in turn independently proportional to the three orthogonal forces as given by the following equations:

$$R_1 31 \ R_2 - R_3 + R_4 = -4\Delta R_z F_z \tag{11}$$

$$R_1 31 \ R_2 - R_3 - R_4 = +4\Delta R_x F_x \tag{12}$$

$$R_1 30 \ R_2 - R_3 - R_4 = +4\Delta R_y F_y \tag{13}$$

For forces in the opposite directions, for example along –x rather than +x in FIG. 4, the sign of the currents is reversed. Other bridge combinations and placements of the four resistors on the cantilever 10 or even on the clamping means 11 are also possible without altering the basic advantages of the design or the relevant equations.

When the present invention is operated in OPTICAL mode, instead of measuring changes in resistance, a user measures changes in angular deflections at some point on the cantilever surface 10, for example, at Q or Q' in FIGS. 3 and 4. In this situation, using a single light beam, a fixed deflection point, and a four-quadrant photo-detector, it would be possible to independently measure only two orthogonal forces at the same time.

The above illustrates the following advantages that are provided by the system of the present invention:

(1) The present invention allows for three orthogonal forces to be measured independently at the same time. Prior art devices only allow the simultaneous measurement of two orthogonal forces. However, the device can certainly be used to measure only one or two modes, if so desired by the user.

(2) The present invention has a higher general sensitivity to measuring forces than the prior art because it makes use of a full-bridge configuration, rather than a half-bridge construction. This doubles the intrinsic electric sensitivity of the bridge. It will also effectively eliminate differential thermal drifts because all four resistance elements are located in the same place. With the half-bridge configuration, two of the resistors are located far from the cantilever resistors, which makes it more difficult to balance the bridge.

(3) The symmetrical design of the cantilever system will ensure that all force-detecting modes (bending, twisting, buckling, and twist-bending) will respond independently to tip forces acting along the x, y, and z directions, i.e., the output signals given by Eqs (11)–(13) do not contain unwanted signals due to coupling or cross-talk between the bending, twist-bending, and buckling modes.

(4) The new cantilever design of the present invention may also be used with the optical method of detecting displacement, whereby the light beam reflects off the cantilever surface at some suitable point (not necessarily the center).

(5) The large distance between the tip and cantilever reduces unwanted viscous damping forces due to liquid trapped between the sample and the cantilever surfaces.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A cantilever spring mounting system for probe microscopy comprising:

at least two mounting means, at least two cantilever spring sections mounted in series therebetween, and a probe comprising a tip with a rigid mounting base affixed to an underside of said cantilever spring sections; wherein said cantilever spring sections are fixed symmetrically about said tip by clamping means situated at ends of said cantilever spring sections, said rigid base of said tip is situated at a center of said cantilever spring sections so as to form a symmetrical configuration such that when a force directed along a vertical axis acts on said tip, said force displaces said tip only in the vertical direction, and when a first lateral force is applied to said tip in a first lateral direction along a first lateral axis orthogonal to said vertical axis, said first lateral force displaces said tip only in said first lateral direction, and when a second lateral force is applied to said tip in a second lateral direction along a second lateral axis orthogonal to said vertical axis and said first lateral axis, said second lateral force displaces said tip only in said second lateral direction, and wherein a force applied to said tip in a positive direction relative to said vertical axis, said first lateral axis, and said second lateral axis will cause a deflection equal in magnitude to a deflection caused by a force of equal magnitude applied to said tip in a negative direction.

2. The cantilever spring mounting system of claim 1 wherein:

arms of said clamping means provide rigid clamps to hold said cantilever spring sections in position, said arms of said clamping means move slightly inwards, towards each other, when said cantilever spring sections bend, buckle, or twist.

3. The cantilever spring mounting system of claim 1 wherein:

ends of said cantilever spring sections are split into at least two sections.

4. The cantilever spring mounting system of claim 1 wherein:

resistance strain gauges are placed on said cantilever spring sections in order to measure deflection of said cantilever spring sections.

5. The cantilever spring mounting system of claim 4 wherein:

at least four of said gauges are utilized.

6. The cantilever spring mounting system of claim 4 wherein:

ends of said cantilever spring sections are split into at least two sections in order to enhance sensitivity to twist and to avoid electrical interference between said gauges and connecting wires of said gauges.

7. The cantilever spring mounting system of claim 6 wherein:

at least four of said gauges are utilized.

* * * * *